United States Patent [19]

Arnold et al.

[11] Patent Number: 4,977,223
[45] Date of Patent: Dec. 11, 1990

[54] THERMOSET RIGID ROD MOLECULAR COMPOSITE SYSTEM

[75] Inventors: Fred E. Arnold, Centerville; Thaddeus E. Helminiak, Dayton; Donald R. Wiff, Akron; Loon S. Tan, Centerville, all of Ohio; Wen F. Hwang, Midland, Mich.; Hoe Chuah, Centerville, Ohio

[73] Assignee: The United State of America as represented by the Secretary of the Air Force, Washington, D.C.

[21] Appl. No.: 307,112

[22] Filed: Feb. 2, 1989

[51] Int. Cl.$^5$ .................... C08L 77/00; D01F 1/00; D01F 11/00
[52] U.S. Cl. .................... 525/432; 264/178 R; 264/178 F; 264/183; 264/203; 264/331.11; 264/331.12
[58] Field of Search .................... 525/432; 264/178 R, 264/178 F, 183, 203, 331.11, 331.12

[56] References Cited

U.S. PATENT DOCUMENTS

| | | |
|---|---|---|
| 3,679,638 | 7/1972 | Korsgen et al. . |
| 3,985,934 | 10/1976 | Farrissey, Jr. et al. ......... 264/178 F |
| 4,108,835 | 8/1978 | Arnold et al. . |
| 4,207,407 | 6/1980 | Helminiak et al. . |
| 4,377,546 | 3/1983 | Helminiak et al. . |
| 4,675,370 | 6/1987 | Tan et al. . |
| 4,683,309 | 7/1987 | Unroe et al. . |
| 4,711,964 | 12/1987 | Tan et al. . |

*Primary Examiner*—Lewis T. Jacobs
*Assistant Examiner*—Vasu S. Jagannathan
*Attorney, Agent, or Firm*—Charles E. Bricker; Donald J. Singer

[57] ABSTRACT

Provided is a molecular composite comprising a rigid-rod aromatic heterocyclic polymer, a flexible, coil-like thermoplastic polymer and a thermosetting polymer.

Also provided is a method for fabricating a molecular composite film or fiber which comprises the steps of forming a biphasic, stir opalescent solution of a rigid-rod aromatic heterocyclic polymer, a thermoplastic polymer, a thermosetting polymer and a solvent which is common to the three polymers, adding solvent to the solution until the solution becomes isotropic and stir opalescence has ceased to determine the critical concentration of polymers in the solvent, adding additional solvent to the solution so that the polymer concentration is below the critical concentration, extruding the solution into a non-solvent for the polymers to form the desired film or fiber, drying the film or fiber and hot drawing the film or fiber at a temperature above the Tg of the thermoplastic, but below the polymerization temperature (Tpoly) of the thermosetting resin.

2 Claims, No Drawings

THERMOSET RIGID ROD MOLECULAR COMPOSITE SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to composite polymeric materials, particularly composite materials containing rod-like aromatic heterocyclic polymers dispersed in a polymeric matrix.

Chopped fiber reinforced plastics are currently being used in the fabrication of a wide variety of components. There are several disadvantages in the use of fiber for reinforcement of plastic. In the case of chopped glass fibers, a large amount of fiber, generally a minimum of 30 percent by weight, is necessary for reinforcement because of the low reinforcing effect of the fiber. There is a practical processing limit on the effective fiber length. A macroscopically long fiber length is required with due regard to breaking or destruction of the fiber during processing, particularly molding. Composite materials containing chopped fibers are generally less processable than their non-reinforced counterparts. The shape of moldings is often limited to simple block or sheet forms. Films or filaments cannot be formed from chopped glass fiber-reinforced plastics. Other disadvantages of these materials include poor surface properties of molded articles, an anisotropy in dynamic properties of moldings, molding defects due to heterogeniety of the polymeric materials, and low cycle time in processing.

A need exists for high strength reinforced composites and a method for their manufacture which possess at least the following desirable prerequisites: (1) non-reliance on fiber reinforcement for the attainment of high strength properties; (2) circumvention of the complexities of current composite fabrication procedures, and (3) elimination of any possibility of fiber-polymer interface problems.

Various attempts have been made to overcome some of the above-described disadvantages of chopped-fiber-reinforced plastics. One approach described by Helminiak et al, U.S. Pat. Nos. 4,207,407 and 4,377,546, comprises the dispersion of an intrinsically rigid rod-like heterocyclic polymer in a flexible, coil-like heterocyclic polymer. These composites are referred to as molecular composites. While this approach represents a valuable contribution to the art, it has certain drawbacks. For example, poly (p-phenylene benzobisthiazole) (PBT) has superior mechanical properties and thermal stability. However, PBT degrades before it melts; therefore, processing of a composite containing PBT must be carried out in a solution state with an acid, such as methanesulfonic-acid (MSA), as the solvent. Relatively few flexible coil polymers can be dissolved in or are stable in MSA, thus limiting the choice of matrix polymers. Molecular composites based on PBT and poly-2,5-benzimidazole (ABPBI) have been fabricated into fibers and thin films. However, ABPBI does not have a glass transition (Tg) temperature. Therefore, molecular composites containing ABPBI are difficult to thermally consolidate into thicker specimens. To overcome this problem, thermoplastic matrices have been used so that the molecular composite films could be laminated. However, thicker specimens fabricated using thermoplastic matrices are limited to use at temperatures below the Tg of the matrix polymer(s). Conventional thermoset resins, such as bismaleimides, epoxies and the like, are not stable in the acid medium used to process the rigid-rod polymer, and cannot be used as host matrices for molecular composites.

Accordingly, it is an object of the present invention to provide a molecular composite having thermoplastic and thermosetting properties.

Other objects, aspects and advantages of the present invention will be apparent to those skilled in the art.

SUMMARY OF THE INVENTION

In accordance with the present invention, there is provided a molecular composite comprising a rigid-rod aromatic heterocyclic polymer, a flexible, coil-like thermoplastic polymer and a thermosetting polymer.

Also provided is a method for fabricating a molecular composite film or fiber which comprises the steps of forming a biphasic, stir opalescent solution of a rigid-rod aromatic heterocyclic polymer, a thermoplastic polymer, a thermosetting polymer and a solvent which is common to the three polymers, adding solvent to the solution until the solution becomes isotropic and stir opalescence has ceased to determine the critical concentration of polymers in the solvent, adding additional solvent to the solution so that the polymer concentration is below the critical concentration, extruding the solution into a non-solvent for the polymers to form the desired film or fiber, drying the film or fiber and hot drawing the film or fiber at a temperature above the Tg of the thermoplastic, but below the polymerization temperature (Tpoly) of the thermosetting resin.

DESCRIPTION OF THE PREFERRED EMBODIMENT

The rod-like aromatic heterocyclic polymers employed in the practice of the present invention exhibit "para" ordered geometry. Examples of such polymers, which are described in the literature, include those having repeating units of the following formulas:

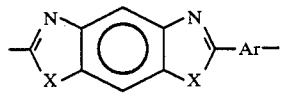

or

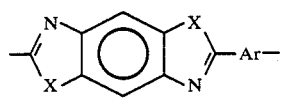

wherein X is NH, N$\phi$, O or S, wherein $\phi$ is phenyl or a substituted phenyl group, and wherein Ar is a para-oriented aromatic group such as

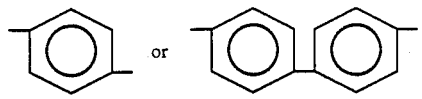

although the present invention is not limited thereto. Examples of other rod-like polymers are disclosed in U.S. Pat. No. 4,108,835, which is incorporated herein by reference. In general, the number of repeating units is such that the polymer has an intrinsic viscosity of at least 5 dl/g, preferably 10 to 40 dl/g, as determined in methanesulfonic acid at 30°C.

The flexible, coil-like thermoplastic polymers employed in the practice of the present invention are those polymers which can be dissolved in the common solvent without being chemically degraded and which have a softening point above ambient temperature and below the temperature of onset of polymerization of the thermosetting resin. Suitable thermoplastic polymers include polyamides, substituted polyamides, phenylated polyquinoxalines and the like. Examples of suitable thermoplastic polymers include polyamides having repeating units of the following formulas:

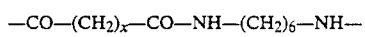

when
x is 4, nylon 6,6,
x is 8, nylon 6,10;

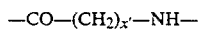

when
x' is 5, nylon 6,
x' is 6, nylon 7,
x' is 8, nylon 9;
and

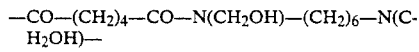

as well as copolymers and terpolymers containing these repeating units; and polyphenylquinoxalines having repeating units of the formula:

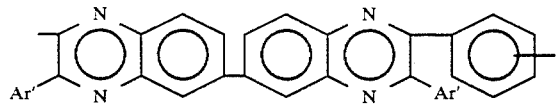

wherein Ar' is phenyl, phenoxyphenyl and the like. The polymer chain has sufficient of these repeating units that it has an inherent viscosity of about 1 to 5 dl/g in methanesulfonic acid at 30°C.

The thermosetting resin employed in the present invention can be any resin having mono- or di-functional end and/or pendant groups which is not chemically degraded by the common solvent. Additionally, the resin should have a polymerization temperature sufficiently higher, i.e., at least about 25°C., than the softening temperature of the thermoplastic polymer so that vitrification does not occur during shaping or drawing operations. A suitable resin is a bis(benzocyclobutene)-terminated imide oligomer of the formula:

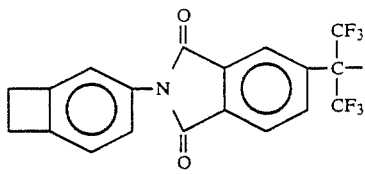

-continued

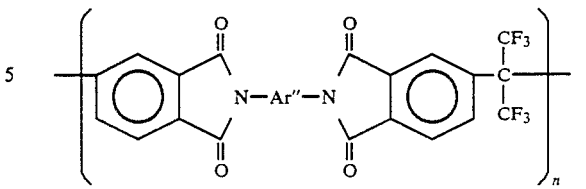

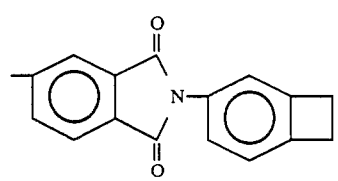

wherein AR" is

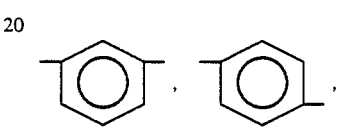

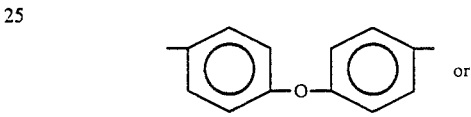

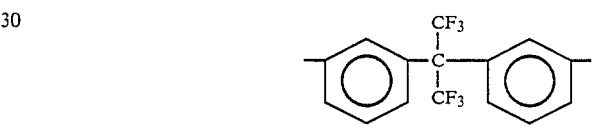

and n has a value of 0 to 10. In a presently preferred embodiment, the thermosetting resin is a mixture of the above-described obligomers wherein at least about 90 weight percent of the mixture consists of oligomers wherein n is 0 to 6. Preparation of these oligomers is described in application Ser. No. 935,447, filed Nov. 26, 1986.

The common solvent for the above-described polymeric materials can be concentrated sulfuric acid, m-cresol or, preferably, methanesulfonic acid.

The molecular composite comprises about 10 to 60 weight percent rigid-rod aromatic heterocyclic polymer, about 15 to 35 weight percent thermoplastic polymer and about 20 to 60 weight percent thermosetting polymer. In a presently preferred embodiment the composite comprises about 25 to 45 weight percent rigid-rod polymer, about 15 to 35 weight percent thermoplastic polymer and about 30 to 50 weight percent thermosetting polymer.

The method of this invention comprises, in sequence the following steps:

1. Determine the critical concentration point at any particular temperature of a quaternary solution prepared by dissolving any composition (by weight percent) of rigid rod polymers, flexible coil thermoplastic polymers, and thermoset oligomers in a common good solvent, (such as methanesulfonic acid) by slowly titrating an originally biphasic, stir opalescent solution of known concentration with solvent until a point is reached at which the solution become isotropic and stir opalescence has ceased. The critical concentration point of the quaternary solution is defined as the maximum concentration of polymers in a solvent at which it is still optically isotropic at any particular temperature and pressure. At this point, the solution is optically transparent.

2. Prepare a quaternary solution with a concentration about 0.1 to one weight percent lower than its corresponding critical concentration point, depending upon the rheological characteristics of each individual polymer in the solvent, to ensure that no extension (or pressure) induced phase separation or segregation occurs in the solution.

3. Transfer the isotropic solution to the solution reservoir of an extruder under an inert atmosphere.

4. Extrude the solution as a fiber or film at a constant rate directly into a coagulation bath of, for example, deionized water or other washing medium such as weakly acidic medium.

5. Collect the extruded, coagulated film or fiber on a collection reel. The film or fiber may be partially oriented at this point.

6. Wash the film or fiber to remove the residual solvent.

7. Dry the wet film or fiber at a mild temperature conditions (e.g. < 30°C.) to prevent bubbling and drastic chemical reactions due to residual solvent or water in the film or fiber at later high temperature post treatment.

8. Further dry the film or fiber at ambient temperature in a vacuum chamber before subsequent heat treatments.

9. Hot draw the dry film or fiber by passing the same through a hot oven or over a "hotshoe" at a temperature above the Tg of the thermoplastic, but below the Tpoly of the thermoset, under tension and preferably in an inert atmosphere.

It will be appreciated by those skilled in the art that during the extrusion step, the rigid-rod polymer is at least partially oriented in the direction of extrusion. Further orientation of the rigid-rod polymer is accomplished during the hot drawing step. It will be further appreciated that the thermoplastic polymer provides structural integrity for the composite structure during the coagulation, collection, washing, drying and drawing steps 4 through 9.

The thus-oriented film or fiber may then be cured by heating the same to a temperature sufficient to cure the thermosetting resin. In the previously described resin having an m-phenylene group in the Ar'' position, curing begins at about 226°C. with a maxima in the exotherm at about 257°C.

Alternatively, a built-up article may be fabricated by stacking a plurality of layers of the uncured film in a suitable mold and compression molding the resulting stack under pressure at a temperature sufficient to cure the resin. The layers of oriented film may be laid up with all the layers oriented in the same direction or with alternating layers at an angle relative to the next adjacent layers.

The following example illustrates the invention:

EXAMPLE

A polymer blend in accordance with the present invention was prepared by dissolving, in freshly distilled methanesulfonic acid (MSA). 36 parts by weight of poly-p-phenylenebenzbisthazole (PBT) (intrinsic viscosity 31 dl/g), 24 parts by weight of a nylon terpolymer (NTP) (6, 6/6, 6/9, available from Belding Corticelli Thread Co., P.O. Box 32, Putnam, CT) and 40 parts by weight of the bis-(benzocyclobutene)--terminated imide oligomer described previously (BCBO). MSA was added to the solution until the solution became isotropic and stir opalescence had ceased. Additional MSA was added to provide a solution concentration of 2.9% at 24–26°C. Vacuum was applied to degas the solution.

The solution was transferred to an extrusion cell and further degassed. Continuous thin film, about 10 to 20 $\mu$m thick, was made by extruding the solution through a single slit die onto a rotating drum immersed in cold distilled water to coagulate the film. The coagulated film was washed to remove residual acid and wound onto a drum to build up the film thickness. The film was dried under vacuum at about 90°C. for 48 hours. After drying, a coherent stacked film about 0.5 mm thick was obtained.

Tensile test specimens. 0.5-inch by 3 inches, were prepared by stacking a plurality of films in a compression mold and curing the films under a pressure of 2 Ksi and a temperature of 260°C. for 25 min. The tensile properties are shown in the Table below.

For comparison, test specimens were prepared as described above for composites containing no BCBO. The tensile properties of these specimens are also shown in the Table.

TABLE

| Sample Compn. (Parts by Weight) | | | Modulus | Tensile | Elongation |
|---|---|---|---|---|---|
| PBT | NTP | BCBO | (msi) | (Ksi) | % |
| 50 | 50 | — | 1.07 | 1.49 | 0.2 |
| 30 | 70 | — | 0.41 | 8.18 | 1.1 |
| 36 | 24 | 40 | 3.25 | 14.50 | 0.3 |

Various modifications may be made without departing from the spirit of the invention or the scope of the appended claims.

We claim:

1. A method for the preparation of a composite film or fiber which comprises the steps of:
   (a) dissolving about 10 to 60 weight percent of an aromatic heterocyclic right-rod polymer, about 15 to 35 weight percent of a flexible coil-like thermoplastic polymer and about 20 to 60 weight percent of a thermosetting resin in a solvent selected from the group consisting of concentrated sulfuric acid, m-cresol and methanesulfonic acid, at a concentration about 0.1 to 1.0 weight percent less than the critical concentration point of the solution;
   (b) extruding the solution resulting from step (a) into a coagulation bath for removing said solvent;
   (c) collecting the extruded film or fiber resulting from step (b) and washing the extruded film or fiber to remove further solvent;
   (d) drying the wet film or fiber from step (c) at a temperature of less than about 30°C;
   (e) hot drawing the dry film or fiber by heating the same at a temperature above the Tg of said thermoplastic polymer and below the Tpoly of said thermosetting resin; and
   (f) cooling the composite to ambient temperature;
   wherein said aromatic heterocyclic rigid-rod polymer has repeating units selected from the group consisting of

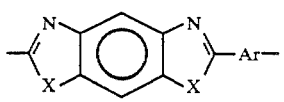

and

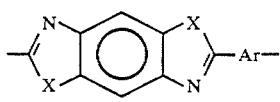

wherein X is NH, Nφ, O or S, wherein φ is phenyl or a substituted phenyl group, and wherein Ar is

wherein said thermoplastic polymer is selected from the group consisting of polyamides and polyphenylquinoxalines, wherein said polyamides comprise repeating units selected from the group consisting of —CO—(CH$_2$)$_x$—CO—NH—(CH$_2$)$_6$—NH— wherein x is 4 or 8,

—CO—(CH$_2$)$_{x'}$—NH— wherein X' is 5 to 8,
and

—CO—(CH$_2$)$_4$—CO—N(CH$_2$OH)—(CH$_2$)$_6$—N(CH$_2$OH)— and copolymers and terpolymers containing these repeating units; and wherein said polyphenylquinoxaline has repeating units of the formula

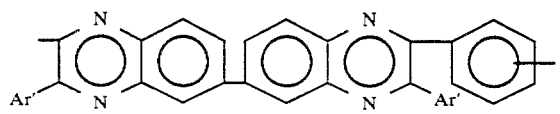

wherein AR' is a phenyl or phenoxyphenyl group; and wherein said thermosetting resin is a bis(benzocyclobutene)-terminated imide oligomer of the formula

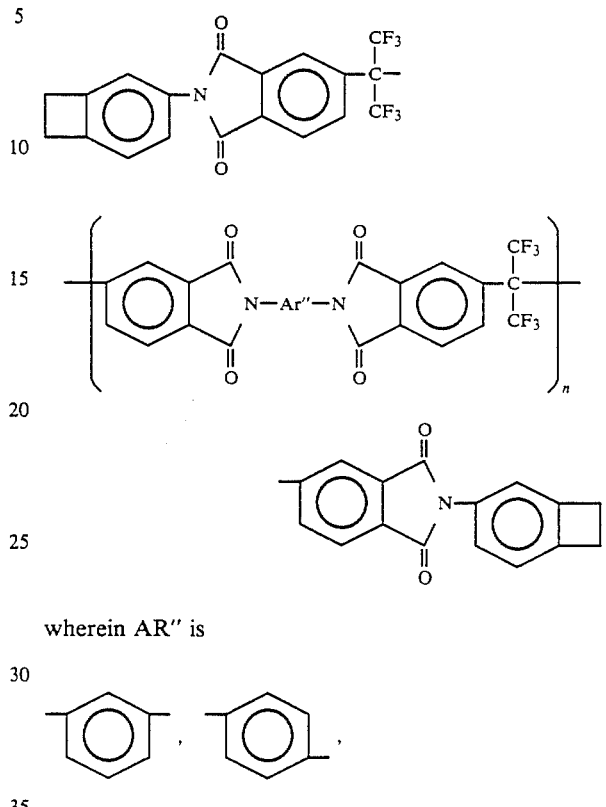

wherein AR'' is

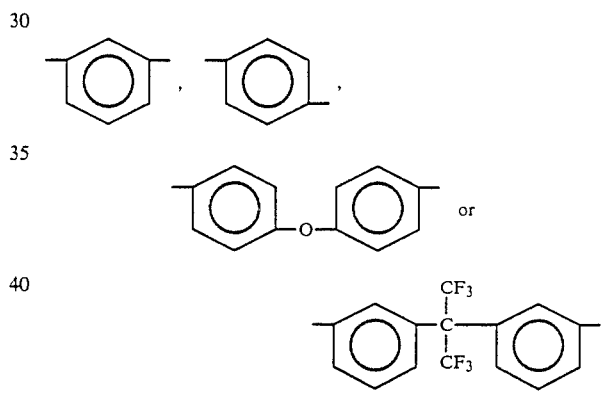

and n has a value of 0 to 10.

2. The method of claim 1 wherein said solvent is methanesulfonic acid.

* * * * *